United States Patent [19]
Shea, Sr.

[11] Patent Number: 5,588,736
[45] Date of Patent: Dec. 31, 1996

[54] SELF-LIGHTED SAFETY HELMET

[76] Inventor: Raymond E. Shea, Sr., 1030 Stafford St., Rochdale, Mass. 01542

[21] Appl. No.: 549,326

[22] Filed: Oct. 27, 1995

[51] Int. Cl.$^6$ ..................................................... F21L 15/14
[52] U.S. Cl. .......................... 362/106; 362/84; 362/183; 362/32
[58] Field of Search ............................. 362/32, 105, 106, 362/34, 84, 183; 250/462.1; 2/209.11, 200.1

[56] References Cited

U.S. PATENT DOCUMENTS 4,521,831  6/1985  Thayer ................................. 362/106 X
5,283,911  2/1994  DeMars ................................ 362/106 X Primary Examiner—Stephen F. Husar
Attorney, Agent, or Firm—Brian M. Dingman

[57] ABSTRACT

A self-lighted safety helmet, comprising a helmet body with a phosphorescent outer shell member; and a radiation source providing radiation to the outer shell capable of inducing phosphorescence of the outer shell, to project luminescence from the helmet to increase helmet visibility.

19 Claims, 2 Drawing Sheets

SELF-LIGHTED SAFETY HELMET

FIELD OF INVENTION

This invention relates to a sell-contained, light-radiating safety helmet.

BACKGROUND OF INVENTION

The wearing of safety helmets for sporting activities has become more commonplace and accepted, and also in some instances mandated by law. Many states require persons riding bicycles, particularly children, to wear an approved safety helmet. Helmets are also worn by adults when riding motorcycles, and particularly children when engaged in sporting activities such as ice skating and in-line skating in which the possibilities of an accident, and a traumatic head injury resulting from an accident, are relatively great.

Safety helmets typically comprise a helmet body made from styrofoam or another light weight, impact-absorbing substance. The helmet body is often times partially or fully covered with a harder outer shell that is commonly made of a more dense plastic material. Safety standards for such helmets have been promulgated by organizations such as the American National Standards Institute.

Many of these sporting activities can and do take place at night, particularly the riding of bicycles and motorcycles. Obviously, rider visibility is of utmost concern in these situations. Vehicle visibility can be increased by the use of reflectors and battery or generator-powered lights attached to the vehicle frame. Rider visibility may be enhanced by the use of reflective materials on shoes or other articles of clothing. There are also small battery-powered light units that can be attached to the helmet. Such lighting units, however, are primarily for lighting the ground area in front of the cyclist, and thus do not substantially increase rider visibility.

SUMMARY OF THE INVENTION

It is therefore an object of this invention to provide a safety helmet that increases the nighttime visibility of the wearer.

It is a further object of this invention to provide such a safety helmet which is self-lighted.

It is a further object of this invention to provide such a safety helmet that glows in the dark.

It is a further object of this invention to provide such a safety helmet that is visible from a long distance.

It is a further object of this invention to provide such a safety helmet that is fully self contained.

This invention results from the realization that a highly visible, glow in the dark safety helmet may be accomplished by making at least a portion of the helmet outer shell from a phosphorescent material, and providing a light source for the shell so that the phosphorescent shell or shell portions glow in the dark.

This invention features in one embodiment a self-lighted safety helmet comprising a helmet body with a phosphorescent outer shell member; and a radiation source providing radiation to the outer shell capable of inducing phosphorescence of the outer shell, to project luminescence from the helmet to increase helmet visibility.

The outer shell may be made from a plastic material with an added phosphorescent material. This may be accomplished with a mixture of low density polyethylene with fiberglass reinforcement, and added phosphorescent material. There may be added to this phosphorescent plastic mixture before molding small fiber optic pieces which become embedded in the outer shell to distribute radiation more evenly throughout the shell. This may be accomplished by adding to the above mixture about 3% fiber optic fibers. Fluorescent dyes can also be added to the plastic to enhance the visibility of the phosphorescent shell.

The outer shell preferably includes some means for distributing radiation. This may be accomplished partially with fiber optic pieces embedded in the outer shell, and additionally may be accomplished with a light source and one or more fiber optic transmitters optically coupled to the light source for distributing light from the light source to the outer shell. A fiber optic collector may be used to couple light from the light source to the fiber optic transmitters, which may be accomplished with one or more fiber optic strands. In one embodiment, these strands are capable of conducting light both axially and radially so that they distribute light along their length into the phosphorescent shell to provide more even light distribution. This in combination with the embedded fiber optic pieces, which may also be capable of both axial and radial light transmission, provide much more even distribution of the light throughout the shell. However, even distribution is not required, as the phosphorescent shell will luminesce as long as radiation is provided to it.

The light source is preferably a lamp driven from a battery source that are both built into the helmet body. Rechargeable batteries may be used. In that case, there is preferably a battery charger jack coupled to the rechargeable battery or batteries and built into the helmet so that the batteries can be recharged when the helmet is not in use. There may also be included an on/off switch built into the helmet to allow the lamp to be turned off.

BRIEF DESCRIPTION OF THE DRAWINGS

Other objects, features and advantages will occur to those skilled in the an from the following description of a preferred embodiment, and the accompanying drawings, in which.

Figure 1:
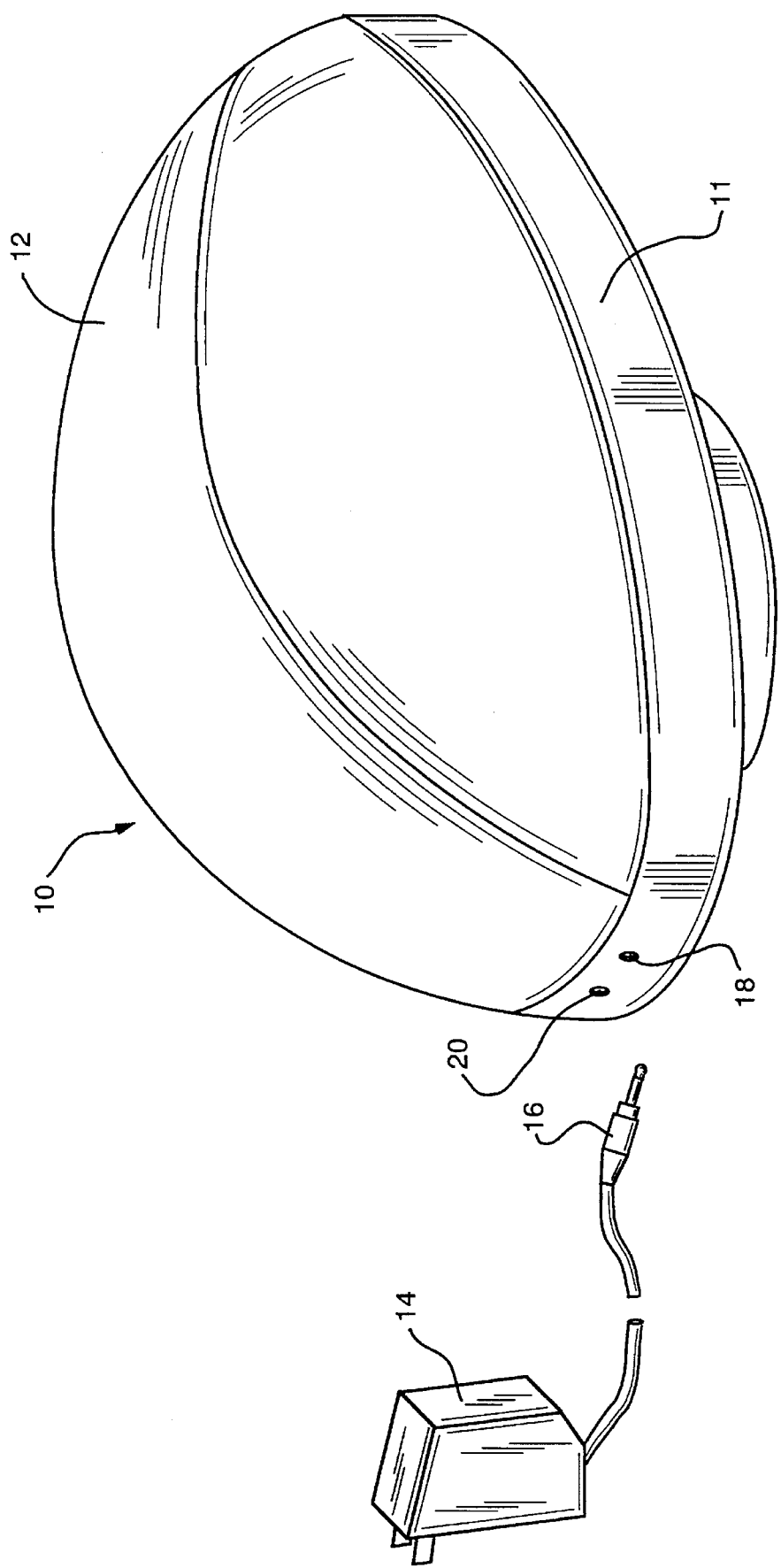
FIG. 1 is a three-dimensional view of a self-lighted safety helmet according to this invention.
Figure 3:
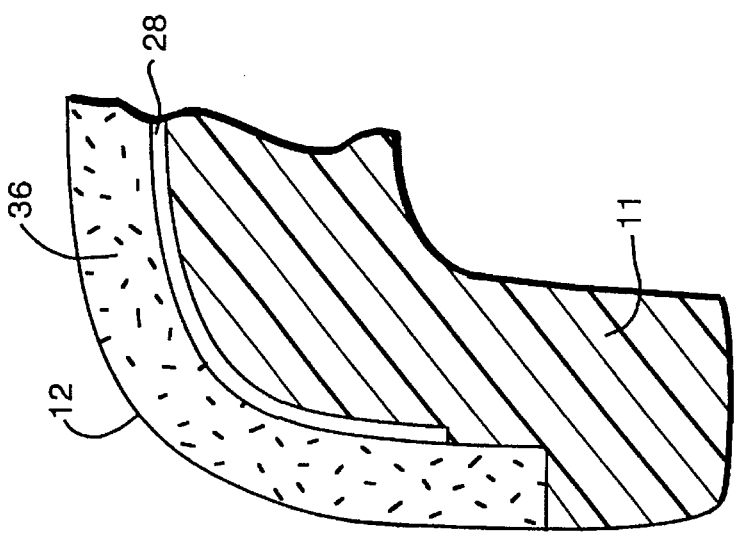
FIG. 3 is a partial cross-sectional view of the self-lighted safety helmet of Figs. 1 and 2.
Figure 2:
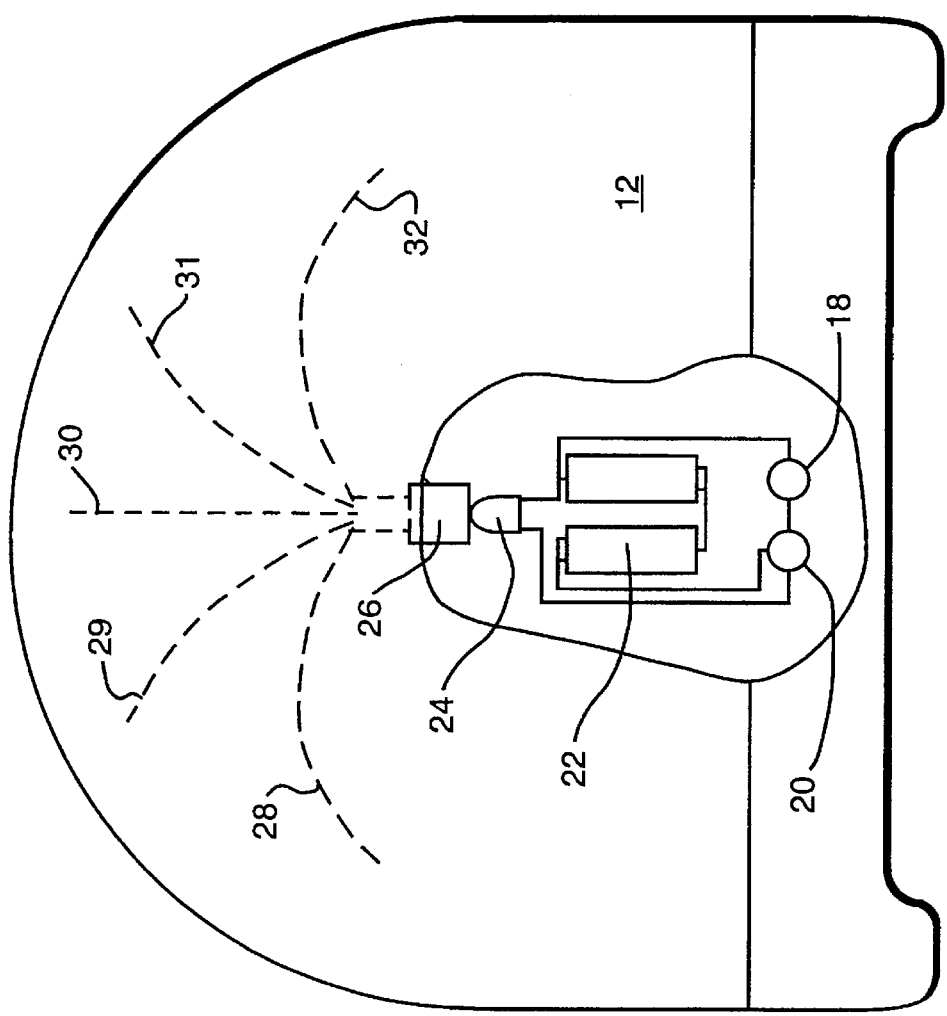
FIG. 2 is a rear, partly cross-sectional, view of the self-lighted safety helmet of FIG. 1.

There is shown in FIGS. 1 through 3 self-lighted safety helmet 10 according to this invention. Helmet 10 includes the standard shock-absorbing helmet body 11 that may be made from a material such as styrofoam. At least some of helmet body 11 is covered with phosphorescent outer harder shell member 12. Also included is a source of radiation at the wavelength which excites phosphorescence in the phosphorescent material of shell member 12 to induce phosphorescence of shell member 12 to project luminescence from helmet 10 and thus increase the visibility of the helmet.

Shell 12 is preferably molded from a mixture of 65% low density polyethylene with fiberglass reinforcement, 32% phosphorescent material such as phosphorescent acrylic resin, and 3% small fiber optic fiber pieces, which are preferably number 140 fibers made by Schott Fiber Optics, Inc., Southbridge, Mass. These fiber optic pieces 36, FIG. 3, become distributed throughout and embedded within shell 12. Fiber optic pieces 36 help to more evenly distribute light throughout shell 12 to provide more even phosphorescence.

The use of fiber optic pieces is not a necessary limitation of the invention, however, as it is necessary only to provide radiation in the right wavelength region to excite phosphorescence in the phosphorescent material used in shell 12.

The preferred embodiment includes a radiation source and means for distributing radiation from the light source to the shell. This is accomplished as shown in FIGS. 2 and 3. Light bulb 24 is powered from rechargeable batteries 22 that are electrically connected to both on/off switch 20 and battery charger input jack 18, both of which are built in to and open from helmet body 11 as shown in FIG. 1. Standard battery charger 14 is adapted to plug into a normal 110 volt home outlet and supply power through jack 16 which fits in receiving jack 18 so that batteries 22 can be recharged when the helmet is not in use.

The light from lamp 24 is coupled by the use of standard fiber optic coupler 26 to fiber optic transmitters 28 through 32. Coupler 26 focuses light it receives from lamp 24 onto the ends of fiber optic transmitters 28 through 32. Fiber optic transmitters 28 through 32 may take any desired form or shape, including but not limited to strands, rods, and flat, flexible fiber optic cables, all of which are available from Schott. If inflexible fiber optic transmitters are used, they can be placed between the helmet body and shell, or at least partially run through the helmet body, to create a desired light distribution. The fiber optic transmitters can be scored along their length to allow the escape of light from the scored area to provide distribution of light along the length of the transmitter as opposed to only from its end. It is preferred to use flexible fiber optic transmitters such as flat transmitter 28, FIG. 3, which can follow the contour of helmet body 11 so that it can be placed between body 11 and shell 12. Alternatively, such flexible fiber optic transmitters could be molded directly into shell 12.

To further enhance visibility of the helmet, shell 12 may also include a known type of fluorescent material added to the plastic before molding, or potentially painted on the shell.

Although specific features of this invention are shown in some drawings and not others, this is for convenience only as each feature may be combined with any or all of the other features in accordance with the invention.

Other embodiments will occur to those skilled in the art and are within the following claims:

What is claimed is:

1. A self-lighted safety helmet, comprising:
    a helmet body with a phosphorescent outer shell member; and
    a radiation source providing radiation to said outer shell capable of inducing phosphorescence of said outer shell, to project luminescence from the helmet to increase helmet visibility.
2. The self-lighted safety helmet of claim 1 in which said outer shell is made from a plastic material with an added phosphorescent material.
3. The self-lighted safety helmet of claim 1 in which said plastic material is polyethylene.
4. The self-lighted safety helmet of claim 2 in which said phosphorescent material is an acrylic resin material.
5. The self-lighted safety helmet of claim 1 in which said outer shell includes means for distributing radiation.
6. The self-lighted safety helmet of claim 5 in which said means for distributing radiation includes fiber optic pieces embedded in said outer shell.
7. The self-lighted safety helmet of claim 5 in which said means for distributing radiation includes a light source, and at least one fiber optic transmitter optically coupled to said light source for distributing light from said light source to said outer shell.
8. The self-lighted safety helmet of claim 7 in which said means for distributing radiation further includes a fiber optic collector for coupling light from said light source to said at least one fiber optic transmitter.
9. The self-lighted safety helmet of claim 7 in which said light source includes a lamp driven from a battery source.
10. The self-lighted safety helmet of claim 9 in which said battery source is built into said helmet body.
11. The self-lighted safety helmet of claim 9 in which said battery source includes at least one rechargeable battery.
12. The self-lighted safety helmet of claim 11 further including a battery charger jack coupled to said at least one rechargeable battery.
13. The self-lighted safety helmet of claim 9 further including an on-off switch for said lamp.
14. The self-lighted safety helmet of claim 2 in which said outer shell further includes a fluorescent material.
15. A self-lighted safety helmet, comprising:
    a helmet body with a phosphorescent outer shell member made from a plastic material with an added phosphorescent material;
    a battery-powered lamp; and
    at least one fiber optic transmitter optically coupled to said lamp for distributing light from said lamp to said outer shell, to project luminescence from the helmet to increase helmet visibility.
16. The self-lighted safety helmet of claim 15 in which said outer shell further includes fiber optic pieces embedded in said plastic material to better distribute light throughout said outer shell member.
17. The self-lighted safety helmet of claim 16 in which said embedded fiber optic pieces distribute light both axially and radially.
18. The self-lighted safety helmet of claim 15 in which said at least one fiber optic transmitter includes fiber optic strands that distribute light both axially and radially.
19. A self-lighted safety helmet, comprising:
    a helmet body with a phosphorescent outer shell member made from a plastic material with an added phosphorescent material, and fiber optic pieces embedded in said plastic material that distribute light both axially and radially to better distribute light throughout said outer shell member;
    a battery-powered lamp; and
    at least one fiber optic strand optically coupled to said lamp and that distributes light both axially and radially, said at least one strand spaced along said shell member to better distribute light throughout said shell member to project luminescence from the helmet to increase helmet visibility.

* * * * *